Dec. 27, 1955           A. W. VIBBER           2,728,185
TWISTING SPINDLE BALLOON CONTROL

Filed March 1, 1952                                 4 Sheets-Sheet 1

INVENTOR
Alfred W. Vibber

Dec. 27, 1955  A. W. VIBBER  2,728,185
TWISTING SPINDLE BALLOON CONTROL
Filed March 1, 1952  4 Sheets-Sheet 2

INVENTOR
Alfred W. Vibber

Dec. 27, 1955　　　　A. W. VIBBER　　　　2,728,185
TWISTING SPINDLE BALLOON CONTROL

Filed March 1, 1952　　　　　　　　　　　　　　　4 Sheets-Sheet 3

INVENTOR
Alfred W. Vibber

Dec. 27, 1955  A. W. VIBBER  2,728,185
TWISTING SPINDLE BALLOON CONTROL
Filed March 1, 1952  4 Sheets-Sheet 4

INVENTOR
Alfred W. Vibber

United States Patent Office 2,728,185
Patented Dec. 27, 1955

2,728,185

TWISTING SPINDLE BALLOON CONTROL

Alfred W. Vibber, Ridgewood, N. J.

Application March 1, 1952, Serial No. 274,401

25 Claims. (Cl. 57—58.55)

This invention relates to an apparatus for continuously detecting changes in the diameter of a rapidly rotating object. More specifically, the invention relates to an apparatus for detecting changes in the diameter of a flying loop or balloon of elongated flexible material such as yarn, as in a yarn twisting spindle. The invention further relates to an apparatus for continuously detecting changes in the diameter of such flying loop or balloon of elongated flexible material associated with a twisting spindle and for automatically and continuously controlling the diameter of such balloon in accordance with such changes.

This application is a continuation-in-part of application Serial No. 214,866, filed March 10, 1951, of application Serial No. 223,188, filed April 27, 1951, of application Serial No. 225,209, filed May 8, 1951, and of application Serial No. 238,215, filed July 24, 1951, all bearing the same title.

In specific embodiments of the invention use is made, in the described system, of the continuous measurements of the diameter of, and/or, by calibration in the manner set out in application Serial No. 225,209, the length of material in the cabling and twisting spindle balloon in controlling its diameter. It has formerly been attempted, in apparatus in which the tension produced in a balloon at the take-up twisting spindle has been balanced against the one or more balloons of the one or more supply spindles, to position a fixed tension imposing device between such supply balloon or balloons and the take-up balloon. Since the tension in such balloons (and thus in the spans leading from them and to them, respectively) does not stay constant, due to minute variations in the gauge and moisture content of the elongated flexible materials such as yarn, and thus of the weight of the material in each balloon, it is not possible to maintain the diameter of the take-up balloon substantially constant by use of a tension compensating means which imposes a fixed retarding tension on such material.

It has also been attempted to employ a variable retarding means between the supply and take-up balloons, such retarding means being variable in response to the variations in tensions of the material traveling therepast. Such devices, however, have been complicated, difficult to maintain, and whereas, when they worked, they did maintain the size of the take-up balloon within fairly narrow limits for appreciable lengths of time, they did so only as a fairly reliable concomitant result of imposing a substantially constant retarding force on the material entering the cabling balloon. Even with the described variable retarding means, however, the system did not insure or work primarily toward the maintenance of a substantially constant cabling spindle balloon size.

The described prior art variable retarding means between the supply and take-up balloons have employed as a tension detecting means positioned above the cabling balloon eye a resiliently mounted deflectable roll over which the combined, but as-yet-untwisted-upon-eachother, strands run in a salient path, whereby changes in tension in the strands are reflected in changes in the amount of deflection of the roll. Such changes in the amount of deflection of the roll are employed as the means for governing a variable strand retarding means acting upon the strands between the detecting roll and the cabling balloon eye. Because the strands running over the detecting roll come from the singles balloons and run into the doubles balloons, the tension in the first portion of the salient run of the strands, that approaching the tension detecting roll, reflects changes in the tensions in the entire system prior to such roll, including the singles balloons and singles back-tensions, and the tension in the second portion of the salient run of the strands, that leaving the detecting roll, reflects changes in the tension in the doubles or cabling balloon. Consequently the detecting roll, being acted upon by both such portions of the salient run of the strands, measures the sum of the tensions in each of such portions of the run.

When the tension in the first portion of the run is not absolutely constant, and it almost never is for any appreciable length of time because of at least minute variations in tension in the singles balloons, singles back-tensions, and in the system between the singles balloons and the first portion of the salient run, the described prior art tension detecting means does not give a true measurement of the tension in the strands in the cabling balloon. Such device also does not give a true measurement of balloon size, balloon diameter, or the length of the strands within the balloon, because added to the lack of true tension detection in the cabling balloon is the fast that, due to moisture content variation, the strands may very well have different weights per unit length in different portions thereof during the operation of the machine to fill one bobbin.

The apparatus of the invention insures a substantially constant cabling spindle balloon diameter by first, establishing a standard desired predetermined take-up balloon diameter, second, measuring variations in diameter of such take-up balloon from such standard diameter, and, third, employing such variations from the predetermined standard diameter to vary the tension in the balloon being controlled, thereby to insure the maintenance of the diameter of the balloons substantially constant.

The present invention is particularly concerned with the control of the diameter of, and/or the length of the material in, the balloon of the cabling and twisting spindle. Such control is effected by the continuous and instantaneous measurement of the diameter of, and/or length of material in, the balloon of the cabling and twisting spindle, and the variation of the size of the baloon in accordance with such measurement. The variation of the size of such balloon may be effected in a variety of ways, which include:

(1) the imposition of a retarding tension on the material entering the cabling spindle balloon, the retarding tension being made responsive to such measurement; and (2) the variation of the size of the singles balloons, and thus the tension imposed on the strands of material entering the cabling spindle balloon of the system, in response to such measurement.

Specifically, the present invention provides a new and improved anemometer balloon diameter and/or length measuring device, such device being an improvement upon that disclosed in Fig. 6 of application Serial No. 214,866, and an improved, more positive, and more powerful system for restoring a balloon, such as the balloon of the doubles spindle in the aforesaid three-spindle system, to its medial diameter when it has varied therefrom. In specific aspects of the invention as shown such system includes as a portion thereof such new and improved anemometer balloon diameter and/or length measuring device, but it will be understood from the following description that other balloon diameter and/or length measuring devices, as set out in the previous applications above referred to, may be substituted in the system for such anemometer device herein described. Further, although in the apparatus primarily illustrated and described herein the material is taken up from the balloon at a substantially constant rate, the rate of feeding of the material into the balloon being varied in accordance with the balloon diameter and/or length measuring means, it is to be understood that in its broader aspects the present invention contemplates as well the use therewith of apparatus in accordance with application Serial No. 238,215, wherein the rate of feeding of the material into the balloon such as the balloon of a down-twisting spindle is substantially constant, the rate of withdrawal of the material from the balloon being varied in accordance with the balloon diameter and/or length measuring device.

Still further, although in the specific embodiments of the balloon controlling system shown the balloon diameter and/or length measuring apparatus does so either by measuring the pressure or speed of the air in the air vortex accompanying the balloon, it is to be understood that in its more inclusive aspects the invention includes, in such system, any other suitable means, including those of my previous applications, which will detect changes in the diameter of the balloon and length of the material in the balloon and thus the peripheral speed of a portion of the balloon, since with a fixed flyer speed the peripheral speed of the portion of greatest girth of the balloon bears a linear relationship to the diameter of the balloon, and which may be employed to control, and effect suitable changes in, the relative speeds of feeding the material into and out of the balloon.

The invention will be more readily understood by reference to the accompanying drawings forming a part of the specification.

In the drawings.

The embodiment of the combination of apparatus, to which the mechanism of the invention is shown as being applied, is generally of the type shown and described in the patent to Uhlig No. 2,487,837, issued November 15, 1949, and No. 2,654,211, issued October 6, 1953. Such apparatus consists of three spindles, spindles 2 and 4 being of the two-for-one singles supply type, the yarn being delivered therefrom in balloons 46 and 54, respectively, through guiding eyes 48 and 56, respectively, to combining or doubling and retarding tension imposing mechanism, from which it is delivered as doubled cord 128 into the infeeding balloon 84 of the central cabling and twisting spindles 6. Spindle 6 is likewise of the two-for-one twisting type, the combined threads receiving a first twist in their passage through the incoming balloon 84 and a second twist in their travel vertically axially through the center driving shaft of the spindle. Upon emerging from the top of such center hollow shaft, the cord is engaged by the positively driven capstan 196 driven in synchronism with such shaft so as to supply the power to withdraw the cord from the balloon 84 to overcome the retarding tension of the tension imposing means and to withdraw the singles from their balloons 46 and 54. After leaving capstan 196, the cord is wound upon the bobbin 126, being laid therein by the reciprocating traverse mechanism 146 having the guiding pulley 144.

Figures 1, 2:
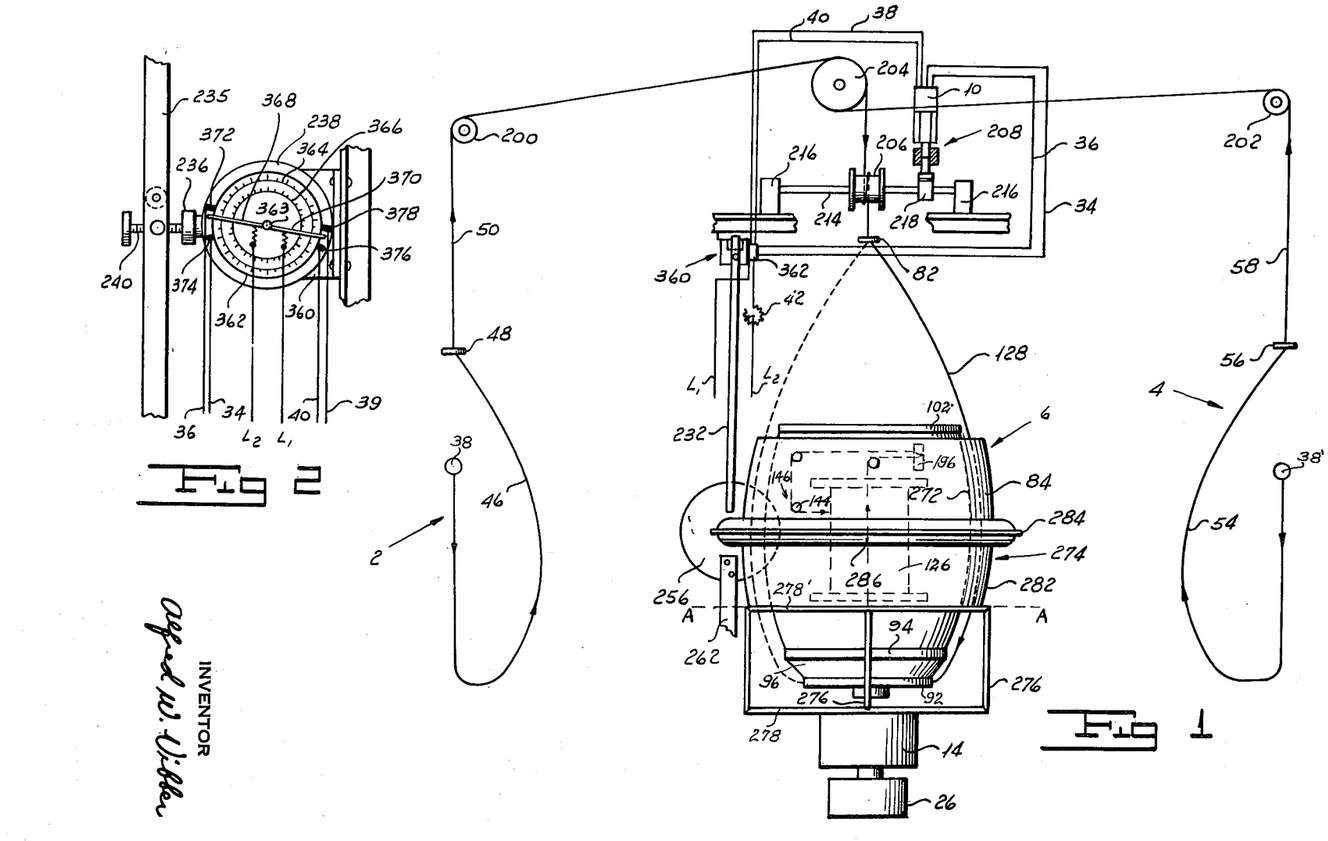
Fig. 1 is a somewhat diagrammatic, over-all view, in side elevation of a twisting and doubling apparatus for forming cord from yarns, such apparatus embodying a first preferred embodiment of the balloon control apparatus described as a means for controlling the diameter of the center, take-up, balloon.
Fig. 2 is a fragmentary view in side elevation of a portion of the apparatus shown in Fig. 1, such apparatus being that which instantaneously measures the diameter of the baloon at the center spindle and which controls the application of the variable brake which applies retarding tension to the material at the entering end of the balloon.

It is with the control of the diameter of the balloon 84 of the system shown in Fig. 1 with which the present invention, in those embodiments relating to balloon control, is concerned. Experience has shown that there is little, if any, difficulty in the control of the singles balloons when proper adjustment is made of the retarding tension imposing means 38 at the top of singles spindle 2 and the tension imposing means 38' at the top of singles spindle 4. Difficulty has been experienced with control of the take-up balloon 84, wherein if the balloon is too tight it rubs upon the upper rub-ring 102 to the consequent damage of the cord, and, if such balloon is too loose, it rubs upon the outer guard member if one is used, also to the damage of the cord. If no such guard is used, the balloon very quickly becomes entangled with the balloons 46 and 54 of the singles spindles if it expands to overlap such balloons.

The balloon control apparatus of the present invention is designed to hold the diameter of the take-up balloon within close limits, so that such balloon neither contacts the inner wear ring or inner guard nor contacts the outer guard or housing member.

In the embodiment of the apparatus shown in Fig. 1, the singles supply spindles 2 and 4 are driven at the same constant high speed and in the same direction by means of a belt (not shown) entrained over the drive pulley of a motor (not shown). The central cabling spindle 6 is driven in the opposite direction at a slightly slower but constant high speed.

To guide the air vortex employed as a balloon measuring means in preferred embodiments of the apparatus, concentric inner and outer guard members are employed at the upper portion of spindle 6 adjacent the largest diameter of the balloon 84. Such inner guard member 272 rests, as shown, upon the outer edge of the bottom, cage forming, member 94 which, as in the aforesaid Uhlig patent, is counterweighted at one side by means not shown so as to hold it, when it is positioned at a slight angle to the vertical, in stable but rockable position. The upper end of the inner guard member 272 is positioned over and thus stably held by the erstwhile rub ring 102. The outer guard member 274 extends to the top of the spindle and down to the level denoted by the line A—A, resting upon an open framework consisting of the fixed horizontal plate 278, the vertical wires 276, and the upper annular wire 278'. Such open work support for the bottom of the guard 274 affords the ready escape in a radial direction of the air vortex stirred up by rotation of the flyer member 92 and the upwardly dished guard member 96 affixed thereto, so that little, if any, of the air attributable to such vortex finds its way into the zone between the inner and outer guard members at the vicinity of the inner end of the air column forming a part of the diameter measuring and detecting means of the invention. Further details of the center spindle and of the balloon diameter detecting means will be described hereinafter.

The twisted singles 50 and 58 proceed upwardly from the balloons of their respective spindles 2 and 4, over the idle guide pulleys 200 and 202, respectively, and thence to the idle gathering pulley 204, from which the combined generally parallel but as yet untwisted-upon-each-other threads are led to the drum 206 of the tension imposing means. After passing around drum 206 several times, thereby to minimize slippage between it and the drum, the combined material 128 is led downwardly through the eye 82 and thence into the incoming or infeeding balloon 84 of the spindle 6. The tension imposing drum 206 is, in the embodiment shown, under the control of a retarding or braking means 208. Drum 206 is mounted upon the rotatably mounted horizontal shaft 214 which, as shown, is mounted in the pillow blocks 216 supported on appropriate portions of the machine frame. The retarding or braking means 208 is designed to impose, once the machine has been placed in operation and adjusted, a controlled variable retarding torque upon the drum 206. Braking means 208 is designed to impose upon the drum 206 a medial retarding torque when the balloon 84 is of the desired diameter, to impose by a separately powered prime mover controlled by the balloon measuring means a constantly increasing retarding force on the drum as the balloon 84 expands, and to impose upon drum 206, likewise by means of the separately powered prime mover under the control of the balloon measuring device, a constantly decreasing retarding force as balloon 84 contracts in diameter, thereby to maintain the balloon 84 of substantially constant diameter. It will be understood that the imposition of a large retarding torque tends to slow the rotation of drum 206, and that as the retarding torque decreases the faster drum 206 tends to rotate.

Figure 3:
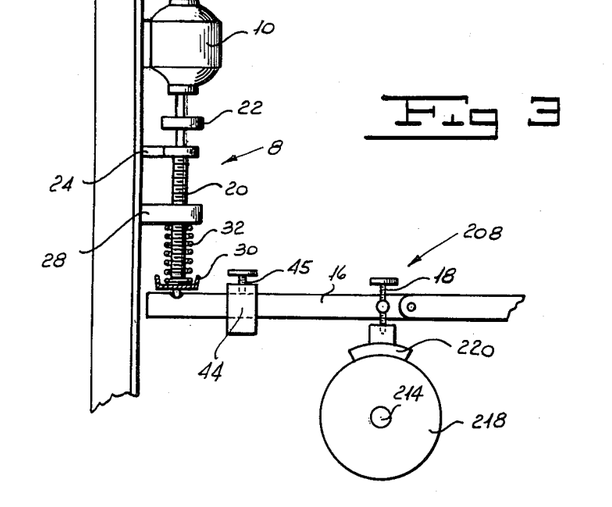
Fig. 3 is a detailed view in side elevation of the brake operating upon the tension applying means at the infeeding end of the balloon and of the motor selectively to adjustably apply such brake.

The construction of the retarding means 208 and of the separately powered means 8 for applying such retarding means is shown more clearly in Fig. 3. As there shown, there is secured to the shaft 214 a brake drum 218. Pivoted to a portion of the machine frame, as shown, is a brake lever 16. Pivoted to such brake lever at a position above brake drum 218 is a brake shoe 220, the brake shoe being held against the brake drum by means of the mechanism 8, to be described, and by means of the weight 44 slidable along lever 16 and held thereon in adjusted position by thumb screw 45.

The mechanism 8, under the control of the balloon diameter and/or length measuring means to be described, consists of the small motor 10 the drive shaft of which is connected by the medium of coupling 22 to the vertical rotatable worm 20 which is mounted to rotate in bearing providing support member 24. Threadedly engaged with the worm 20 is the nut 28, one side of which is slidably and non-rotatably engaged with a vertical guideway on the frame member so that as the worm rotates the nut will rise and fall depending upon the direction of rotation of the worm. As shown, a spring seat providing member 30 is supported on the left-hand end of brake lever 16 by having a central projection thereon, such projection having a rounded bottom end, received within a seat on the lever. A coil spring 32 is telescoped around the lower end of worm 20 and is positioned between the lower surface of nut 28 and the spring seat 30. The spring 32 is preferably so chosen that when the nut 28 lies substantially centrally in its range of vertical travel the spring will impose sufficient pressure upon the brake lever 16, taken with the force also imposed thereon by weight 44 when the latter is placed at a fixed predetermined location lengthwise of lever 16, to cause the retarding or braking means 208 to impose sufficient retardation upon the material entering the doubles balloon to effect a balance in the system when the singles and doubles balloons have their preferred medial diameters. When the diameter of the doubles balloon decreases, the motor 10, in response to the balloon measuring means, will cause the worm 20 to rotate in such direction as to raise nut 28, thereby decreasing the counter-clockwise retarding torque imposed by means 8 upon the brake lever 16. The doubles balloon will thereupon expand to its preferred medial diameter. Should, however, the doubles balloon expand unduly, motor 10 in response to the balloon diameter measuring device will rotate in a reverse direction, thereby to impel nut 28 downwardly, thus to impose a greater counterclockwise torque upon brake lever 16. When the doubles balloon is at the preferred medial diameter, motor 10 remains at rest so as to hold nut 28 in its then correct position.

The balloon diameter and/or length measuring device, previously generally referred to, shown in Fig. 1 includes the previously mentioned outer guard 274 at the doubles spindle, such outer guard incorporating therein the annular manifold 284. Such manifold communicates with the outer guard 274 through the medium of a continuous inwardly facing slot, whereby the air vortex stirred up by the material in the balloon communicates with such manifold. The manifold feeds into an expansible bellows device generally shown at 256, the forward and rear walls of which are rigid in character. The rear wall of the bellows is secured to the bracket 262 which is adjustably attached to a part of the frame of the machine. The forward and rear walls of the bellows, which is more fully described in my above referred to previous applications, are connected by a pleated flexible side wall member. Air under pressure is led to the bellows through an inlet tube which is connected by means of a flexible hose to the manifold 284 on the outer guard 274. It will be apparent that increased pressure in the air column comprising the manifold 284, the delivery tube, the hose, and the inlet pipe to the bellows, will be almost instantaneously transmitted to the bellows 256 which acts as a force multiplying device in accordance with the area of the forward wall of the bellows device.

The movable forward wall of the bellows device is connected to the bottom end of the lever 232 which is pivoted, as shown, to an upper portion of the frame of the machine. Such lever operates the calibrated scale device 360 shown in Fig. 2. Such scale device, which is mounted upon a fixed vertical portion of the frame of the machine, has a dial 362 and a rotating stem 363 projecting through the center of such dial, one arm 368 indicating the pressure exerted upon the scale pan 236 by means of the adjustable pin 240, the rounded forward end of which fits within a suitable depression in the scale pan. The dial 362 is provided with two scales 364 and 366, the former being calibrated so that the hand or arm 368 indicates directly thereon the pressure of the outer portion of the air vortex in that portion in communication with the column of air in the detecting means, and the scale 366, by calibration, indicating directly the diameter of the doubles balloon. Alternatively, also by calibration, scale 366 can indicate the length of the material in the balloon. Both these results are possible because with components including the air column, lever, and so on of fixed known size, the pressure of that portion of the air vortex accompanying the balloon in communication with the inner end of the air column bears a definite empirical relationship to the diameter of the balloon and to the length of the material in the balloon.

As shown in Fig. 2, the scale device is employed to operate a reversing switch mechanism for the control of the above described motor 10. The stem 363 of the scale is made of electrically non-conducting material. Radially projecting therefrom in opposite direction are the two electrically conducting arms, indicating arm 368, above described, and 370. Such arms are connected, respectively, through flexible leads to the wires $L_2$ and $L_1$ of a low potential direct current source for the motor 10. Positioned about the outer edge of the dial 362 is the annular electrically insulating member 238 which is so constructed as to be angularly adjustable about the dial. Member 238 carries thereon, at diametrically opposed zones, the pairs of commutator type contacts 372, 374 and 376, 378, which lie flush with the surface of the member 238 facing the reader in Fig. 2. The outer ends of the arms 368 and 370 are made in the form of electrically conducting brushes, so that a circuit will be completed from the aforesaid lines $L_1$, $L_2$ and the lead wires from such contacts when the arms 368 and 370 make contact with the respective commutator type contacts. The contact 372, 374 and 376 and 378 are spaced from each other, as shown, so that when the arms 368 and 370 lie between them the circuit is broken and motor 10 is at rest.

Figure 4:
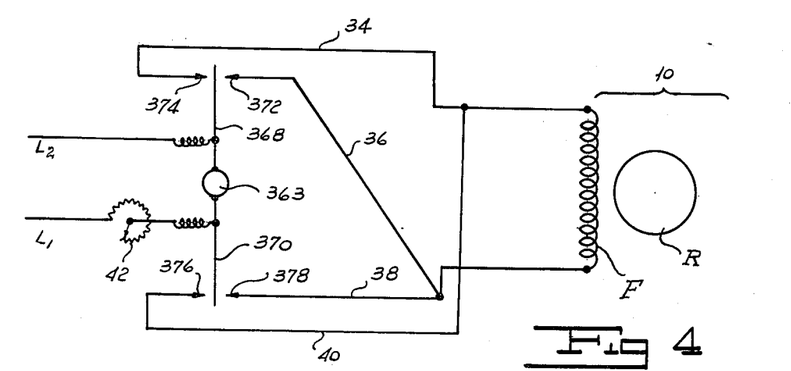
Fig. 4 is a wiring diagram showing the means whereby the motor in Fig. 3 is controlled by the balloon measuring means.

In Fig. 4 there is shown the control circuit whereby the above described reversing switch controls the motor 10. The arms 368 and 370 occupy the same position relative to the pairs of contacts in Fig. 4 that they do in Fig. 2. In such position, which is that which the arms occupy when the doubles balloon has the preferred medial diameter, the motor 10 is de-energized. It will be apparent that, should the stem 368 turn clockwise, a circuit will be completed through line $L_1$, arm 370, contact 376, and wire 40 to the field of the motor, a similar current path being effected from line $L_2$ through arm 368, contact 372, and wire 36 to the field F of the motor. It will be assumed that such is the position occupied by stem 363 when the balloon has expanded unduly. Thereupon the motor 10 will rotate in such direction as to impel nut 28 downwardly to increase the retarding tension imposed upon the material entering the balloon. Should the doubles balloon then contract unduly, the stem 363 will turn counter-clockwise, whereupon arm 368 will contact contact 374 and the arm 370 will engage contact 378, the field F of the motor then being energized through wires 34 and 39, thereby causing motor 10 to rotate in a reverse direction to raise nut 28. Such lowering and raising of the nut will, of course, tend to correct the condition of the balloon which caused the stem 363 to turn, thereby restoring such stem and the arms 368 and 370 to the intermediate, non-contact-engaging, position shown in Figs. 2 and 4.

The motor 10 is preferably of the type energized by a low potential direct current source, the field being the stator and the rotor being of the fixed high permeability magnet type made, for example, of Alnico. Such motor requires low current feed, thereby minimizing contact difficulties at the reversing switch. Furthermore, because of the permanent magnet rotor, the problem of reversing the motor is a simple one. Because by far the greater part of the necessary retarding torque is contributed by weight 44, the motor 10 may be of the very small fractional horsepower type.

It will be seen that the above described structure is particularly characterized by the positiveness and accuracy with which it restores the doubles balloon to its preferred size and maintains it there. This arises from the fact that the balloon diameter and/or length measuring means is called upon, in such apparatus, merely to detect such characteristics of the balloon and that the work of altering the tension imposing means in the system to correct such balloon diameter change is done by power derived from a driving means separate from that produced by the balloon diameter and/or length measuring means. In the illustrative embodiment such work is done by a separately powered prime mover. Furthermore, the separate power source, such as the separately powered prime mover, and its associated retarding or braking system is of such character that it continues to operate in such direction as to correct the change in the balloon diameter until the balloon measuring means indicates that the balloon has been restored to its preferred diameter. The described balloon diameter measuring and controlling device of the invention, therefore, is particularly stable in its operation, so that the system may operate for extended periods with no attention.

Figure 5:
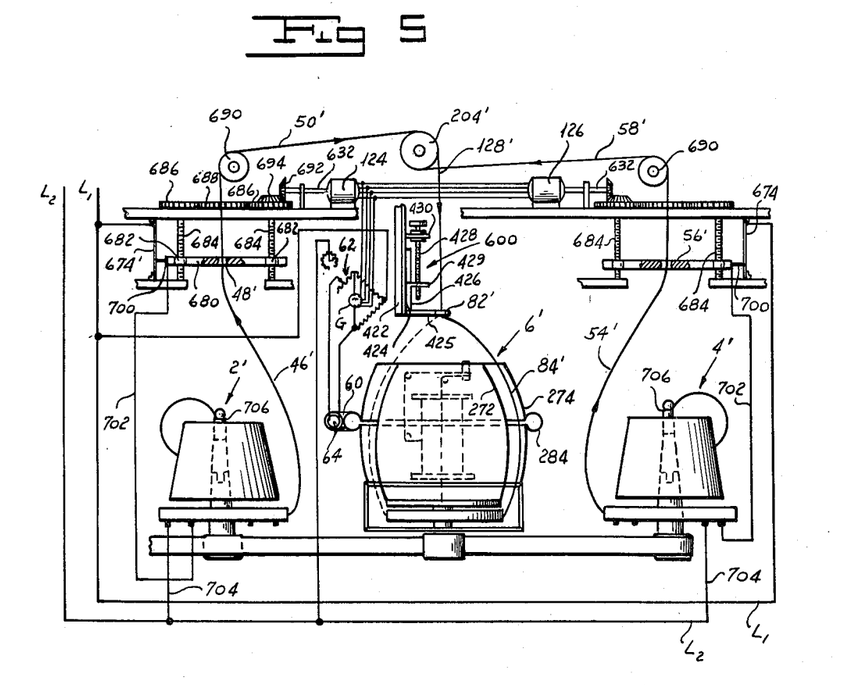
Fig. 5 is a somewhat diagrammatic view in side elevation of a second preferred embodiment of the three-spindle yarn twisting and doubling apparatus constructed generally along the lines of that shown in Fig. 1, the apparatus of Fig. 5 employing an improved anemometer balloon diameter measuring device at the doubles spindle and controlling the tension in the take-up balloon in response to such measurement by variation of the vertical position of the balloon guiding eye above each of the singles balloons.
Figure 6:
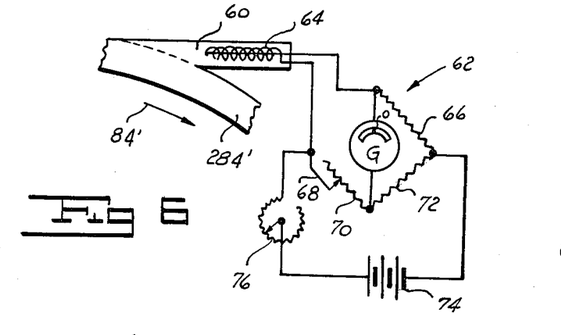
Fig. 6 is a somewhat schematic view of the improved anemometer balloon diameter measuring device and of the bridge circuit associated therewith.
Figure 7:
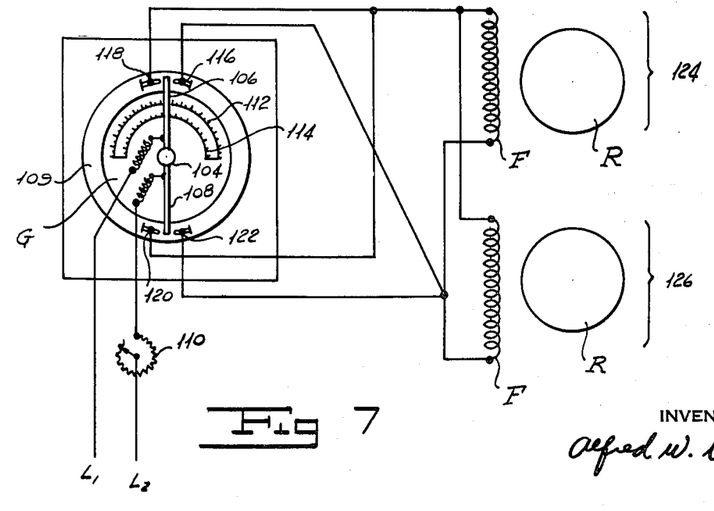
Fig. 7 is a somewhat schematic view of the reversing switch operated by the galvanometer in the bridge circuit in Fig. 6, such reversing switch being shown in association with the motors for adjusting the rising and falling eyes of the singles balloons, the reversing switch being shown in the control circuit operatively connecting such reversing switch and such motors.

In Figs. 5, 6, and 7 there is shown a second embodiment of the balloon diameter and/or length measuring device, such device including a new and improved anemometer, such balloon measuring device, in the embodiment shown, controlling the diameter of the doubles balloon by selectively raising and lowering the balloon guiding eyes of the singles spindles in the disclosed three-spindle system. The apparatus of Figs. 5, 6, and 7 includes an improved, more positive, and more powerful system for restoring such doubles balloon to its medial diameter when it has varied therefrom.

In the system shown in Fig. 5 there is provided a central doubles spindle 6' and two singles spindles 2' and 4' which feed their twisted threads thereto, the threads being combined at the idle gathering pulley 204'. The doubles spindle 6', in which the material forms the balloon 84', is provided as before with an inner guard member 272' and with an outer guard member 274', such latter member having the annular manifold 284' vertically centrally thereof. Such manifold communicates with the space in the spindle in which the balloon rotates through the continuous, inwardly open, slot shown. The eye 82' of the doubles spindle is manually adjustable through the medium of the mechanism generally designated 600. Such latter mechanism, which is mounted on the vertical frame member 422, includes the vertically slidable block 424 on which is affixed the bracket member 426 bearing the eye carrying arm 425 on its lower end and the adjusting screw receiving arm 429 on the top. The adjusting screw 428 is rotatably carried in the bracket member 430 affixed to the frame member 422. Suitable rotation of the worm 428 will, of course, raise or lower the eye 82' so that the initial size of the balloon may be adjusted. After such adjustment the eye 82 is left in such position during the normal run of the machine.

The threads 50' and 58', from spindles 2' and 4', respectively, are combined at pulley 204' into the combined but-as-yet-untwisted upon each other material 128'. The vertical positioning of the eyes 48' and 50', which control the tension in balloons 46' and 54', respectively, of spindles 2' and 4' are under the control of the balloon diameter and/or length measuring means and singles eye adjusting means shown in Figs. 6 and 7 and now to be described.

As schematically shown in Fig. 6, the material in balloon 84' of the doubles spindle sweeps by the inwardly open manifold 284', thereby increasing the air pressure in such manifold. From the manifold, in this embodiment, there leads off the angularly directed open ended jet 60, so that during running of the machine there is a constant current of air outwardly through such jet. As set forth in application Serial No. 214,866, in the discussion of the structure of Fig. 6 therein, the speed of the air current through jet 60 varies with the diameter of the balloon at such spindle, the speed of the air current being less when the balloon diameter decreases and being greater when the balloon diameter increases. Such phenomenon is employed, in the present embodiment, as a means for detecting or measuring the balloon diameter and/or length. Such detecting or measuring means includes a Wheatstone bridge 62, one resistance of which is provided by the detecting heated anemometer resistance 64 which is disposed in the lead-off jet 60 from the manifold 284'. The two resistances 66 and 72 of such bridge are fixed, the left-hand lower resistance 70 being variable as shown by the provision of a sliding contact 68 thereon, so that a suitable balance may be obtained in the bridge circuit when the balloon of the spindle is at its medial diameter. The bridge circuit 62 is energized by the battery 74, a manually operated rheostat 76 being disposed in one of the leads to the bridge circuit. Battery 74, also, in this embodiment, supplies the energy for heating the anemometer resistance 64. A galvanometer G is connected across the bridge circuit from the junction of resistances 64 and 66 to the junction of resistances 70 and 72. It will be apparent that the degree and direction of unbalance of the circuit 62, after the three-spindle system has been brought up to operating speed with the singles and doubles balloons thereof at their medial diameters, will therefore afford a very sensitive and accurate measurement of the variation of the doubles balloon from a preferred predetermined medial diameter thereof. Accordingly, the galvanometer G may be calibrated directly in terms of change of diameter from a central point on the dial of the galvanometer, such central point representing the desired medial diameter of the balloon. It will be apparent that the sliding contact 68 may be employed to select the diameter, within the operating range, at which the described apparatus will maintain the doubles balloon.

In Fig. 7 the galvanometer G of Fig. 6 is shown as controlling the energization of the motors 124 and 126 which determine the vertical positioning of singles balloon guiding eyes 48' and 56', respectively. The galvanometer G has an insulating stem 104 projecting therefrom, on such stem there being secured the radially projecting conducting arms 106 and 108 which are connected, respectively, to the current supply lines L₁ and L₂. A manually operated rheostat 110 is disposed in line L₂. Adjustably rotatably mounted on the galvanometer G is the insulating ring member 109 which carries at diametrically opposed points the opposed sets of adjustable contacts 116, 118 and 120, 122. Members 106, 108, 116, 118, 120, and 122 constitute a means for stopping the rotation of the motors 124 and 126 or for starting them in selectively reverse directions. The motors 124 and 126 may be of the midget motor type having a fixed magnet rotor R, the field F of each motor being supplied by direct current, so that it is possible to reverse the direction of rotation of the motors simply by reversing the leads to the fields. It will be seen that with a proper choice of components and adjustment of resistances 70 and 76, the stem 104 of the galvanometer will occupy the central position shown in Fig. 7 when the balloon of the doubles spindle is of the desired predetermined diameter. Should the balloon increase in diameter, however, the balance through the circuit 62 will be disturbed, whereupon the stem 104 of the galvanometer will rotate in such direction as to establish contact between members 106 and 108 and the appropriate one of each of the set of contacts 116, 118 and 120, 122 to start the motors 124 and 126 to raise their respective singles balloon guiding eyes. The reverse direction of motor rotation will be effected upon a decrease in diameter of the doubles balloon. When the doubles balloon is of the desired diameter, the arms 106 and 108 will remain in the intermediate, non-contact engaging, position shown in Fig. 7, so that the motors 124 and 126 remain non-rotating. The face of the galvanometer G may be calibrated as shown from a central point 0, indicating balance in the circuit 62. In this instance the inner scale 114 is calibrated in terms of deviation from a predetermined speed of the air through jet 60, and the outer scale 112 is calibrated directly in terms of change of the balloon diameter from a predetermined medial diameter thereof.

The thus controlled motors 124 and 126 are connected to their respective singles balloon guiding eye in the manner shown in Fig. 5. Each of the singles eyes is fixedly mounted in the vertically adjustable platform 680, such platform being adjustably mounted on the worms 684, each worm being threadedly engaged in nut 682 affixed to the platform. The thread from the singles spindle proceeds upwardly through the eye over the idle guide pulley 690 and onto the idle and unbraked gathering pulley 204', where it is combined with the other singles strand coming from the other singles spindle. The worms 684 of each singles balloon eye are connected together, so as to rotate in the same direction, by means of the gear 686 positioned on the upper ends of such worms and the intermeshing gear 688, placed at the rear of gear 686 in such position and of such diameter as not to interfere with the vertical travel of the thread from the singles balloon. As shown, the shaft 632 is connected to its respective one of motors 124 and 126. To the end of shaft 632 there is affixed the bevel gear 692 which meshes with the gear 694 on top of one of the worms 684.

When the motor causes the shaft 632 to rotate in one direction it will cause the platform 680 and the eye to rise. Reverse rotation of the shaft 632 by the motor causes such platform and eye to fall. With the rising of the eye, the tension in the singles balloon increases, and therefore tends to counteract the increase in diameter in the doubles balloon. The reverse action takes place upon the falling of the singles balloon eye.

In the apparatus shown in Fig. 5 there is provided a means automatically increasing the back tension on the singles strands upon the increase in height of such singles balloons. A linear resistance member 674' is employed, such resistance member cooperating with the brush 700 on the end of platform 680. The adjustable back tension imposing device 706 in each singles spindle is of such type wherein under operating conditions the back tension increases as the device is increasingly energized. For this reason the upper end of resistor 674' is connected to line L₁. The two wires 704 and 702 proceeding from wire L₂ and the brush 700, respectively, are led to the variable back tension means 706 in a manner indicated and fully described in connection with Fig. 28 of application Serial No. 225,209.

Although the improved anemometer device shown in Figs. 5 and 6 has been shown, and has been described above, in a three-spindle system wherein it controls the rising and falling singles balloon eyes, it will be apparent that it may, if desired be substituted for the balloon diameter measuring and controlling means of Figs. 1–4, inclusive. Thus the retarded drum below the gathering pulley in the system of Figs. 1–4, inclusive, may be braked in the manner there shown, the braking motor being under the control of the hot wire anemometer, bridge, and galvanometer arrangement shown in Figs. 5 and 6.

In the system shown the balloon diameter and/or length measuring means is not confined to one wherein the air pressure or air speed created by the vortex accompanying the balloon is measured to afford a measurement of balloon diameter. As indicated above, other balloon diameter measuring devices may be employed, such as that shown in my prior application Serial No. 223,188, of which the present application is a continuation-in-part, wherein the balloon to be controlled is continuously scanned photo-electrically. The measuring instrument 358 of such photo-electric scanning system may, for example, be employed in the present invention to control the rotor energizing and reversing switch, the switch remaining open when instrument 358 gives a medial reading, corresponding to a medial balloon diameter, the switch energizing the balloon diameter correcting motor or motors to rotate in one direction when the instrument reading is below such medial reading and energizing such motor or motors to rotate in the opposite direction when the instrument reading is above such medial reading.

Further, the balloon diameter and/or length measuring apparatus of the present invention may be employed with a system wherein the speed of feeding of the material into the balloon is substantially constant, the speed of withdrawal of the material from the balloon being varied in accordance with the balloon diameter and/or length measuring means. Thus in the system shown in my prior application Serial No. 238,215 the means for controlling the speed of the various devices for drawing the material out of the balloon may be controlled by the improved balloon diameter and/or length measuring means of the present invention. In the embodiment of Figs. 1, 2, and 3 of application Serial No. 238,215, for example, the balloon diameter and/or length measuring apparatus of the present invention, together with its associated reversing switch and the motor controlled thereby, may be substituted for the expansible chamber 134, the lever 138, and the variable resistor 140 shown in Figs. 1 and 2 of application Serial No. 238,215, resistor 140 being replaced by a conventional variable resistor driven in reverse directions by the motor of the present invention referred to immediately above. In such assembly the motor and the variable resistor operated thereby will be so connected and will operate so as to increase the speed of capstan 96 of application Serial No. 238,215 to withdraw material from the balloon 68 at a faster rate when the diameter of such balloon increases, and to decrease the speed of capstan 96 when the diameter of such balloon decreases.

As an alternative structure, the system of Fig. 7 of application Serial No. 238,215 may be modified in the light of the present invention by omitting the variable resistor 410 and substituting therefor, for operation by lever 408, the scale and reversing switch mechanism shown in Figs. 1 and 2 of the present application, and by employing as a means of controlling the energization of inductor 418 a motor driven rheostat as described in the paragraph immediately above. The direction of rotation of such motor, and the construction of the rheostat, will be such that as the balloon containing material 431 expands the degree of energization of means 418 will increase, thereby to cause withdrawal of material from the ballon at a faster rate, and also such that as the diameter of such ballon decreases the degree of energization of means 418 will decrease, thereby to cause withdrawal of the material from the balloon at a slower rate.

Figures 8, 9, 10, 11, 12:
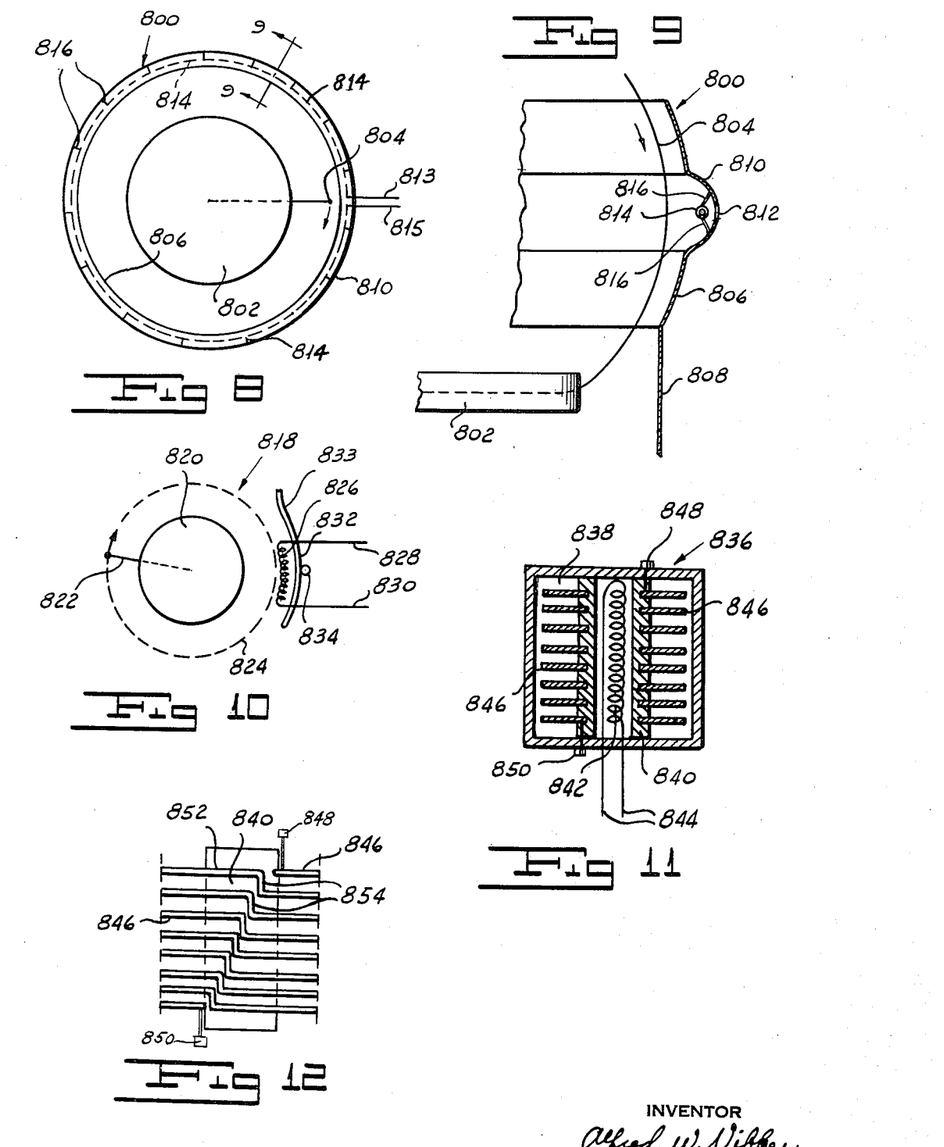
Fig. 8 is a somewhat simplified view in plan of a doubles spindle incorporating yet another type of electrical resistance anemometer for measuring balloon diameter.
Fig. 9 is a somewhat simplified view in vertical section through the structure of Fig. 8, the section being taken along a radial plane denoted by the line 9—9 in Fig. 8.
Fig. 10 is a simplified view in plan of a still further electrical resistance anemometer device shown in association with a balloon creating and maintaining twisting spindle.
Fig. 11 is a view in vertical cross section through a still further type of electrical resistance anemometer, such anemometer being designed to replace that shown in Figs. 5 and 6, the anemometer of Fig. 11 being of the type which is heated from a separate source.
Fig. 12 is a view in rear elevation of the electrical resistance anemometer of Fig. 11.

In Figs. 8 and 9 there is shown another embodiment of the balloon diameter measuring and controlling means, such embodiment also incorporating an electrical resistance anemometer device. The apparatus of Figs. 8 and 9 may be substituted for that shown in Figs. 5 and 6, the leads 813 and 815 from the anemometer resistance of Figs. 8 and 9 being connected to the leads of the Wheatstone bridge in the same manner as are the leads of the anemometer device in Figs. 5 and 6.

In Figs. 8 and 9 there is shown a spindle, generally designated 800, which in this instance is of the downtwister type, being the spindle at the center or doubles spindle of the three-spindle system generally discussed above. Such spindle has a flyer 802 which creates and maintains the balloon 804 in the material traveling downwardly into the flyer. The spindle has an outer guard 806 which is supported, as before, on an open-work supporting means generally designated at 808. In the construction shown the guard 806 has a partially toroidal enlargement 810 at the vertical center thereof, generally opposite the location of greatest diameter of the balloon. Centrally of such enlargement 810 there are a series of uniformly spaced openings 812 outwardly of the guard, the openings being as long circumferentially of the guard as is consistent with the strong attachment of the upper part of the guard to the lower part thereof.

A spirally wound electrical resistance wire 814, functioning as the anemometer resistance, is supported on the wire supporting members 816, which are located at spaced points around the guard 806 as shown, there being insulating collars interposed between the resistor 814 and the wires 816. The resistor 814 is preferably located as shown, so that its radially inner surface lies somewhat outwardly of the curve paralleling balloon 804 and tangent to the inner surface of the guard 806. The two lead wires 813 and 815 to the resistor 814 are brought out together as close as is consistent with insulation thereof from each other, so that substantially the full 360° extent around the guard 806 is covered by an anemometer resistance of substantially uniform resistance per unit length as measured around the guard 806.

In spindles with which the invention is generally concerned the flyer 802 rotates at speeds of from seven to eight thousand R. P. M., which means that the balloon 804 will whip around past any one location on the resistor 814 in the neighborhood of 130 times per second. The anemometer resistance 814 is heated to a point somewhat above room temperature by the current source furnishing energization for the Wheatstone bridge circuit. It will be apparent that the cooling effect caused by the balloon 804 upon the resistor 814 will be greater at a zone adjacent the instantaneous position of the material forming such balloon than it is at points in the air vortex stirred up by the balloon which are spaced, at the same instant, at marked angles from the material in the balloon. The various elements of resistor 814 will thus be momentarily at different temperatures, depending upon the instantaneous angular relationship between such element and the material forming the balloon. Since all elements of resistor 814 are in series, however, and since such resistor has a substantially uniform resistance per unit length, the over-all resistance of resistor 814 will depend upon the speed with which the air vortex passes by it, this in turn depending upon the diameter of the balloon 804. Accordingly, changes in resistance in resistor 814, when impressed upon the Wheatstone bridge of which resistor 814 is an element, will, as before, function as a measurement of balloon diameter, in the controlling of the balloon diameter.

Where the material forming the balloon 804 has a cross-sectional size which is appreciable, so that it stirs up a very marked air vortex, no guard such as guard 806 and its enlargement 810 need be employed with such electrical resistance anemometer. In such cases, it is sufficient merely to support resistance 814 from fixed framework associated with the spindle, such resistor 814 being located quite accurately in a circle coaxial with the flyer 802. In such cases the speed of the air vortex, in the outer edge of which the resistor 814 is located, will give a sufficient change in resistance to allow it to function without a guard. When the material forming balloon 804 is rather fine, however, it is desired, for increased sensitivity of the device, to employ therewith the guard 806 with the enlargement 810, as shown in Figs. 8 and 9. Such guard and the enlargement thereof function to funnel the air thrown outwardly by the balloon over a substantial vertical extent thereof centrally into the enlargement 810 and thence through the resistor 814 and out the openings 812. Thus the guard 806 in the enlargement 810 employed in connection with the resistor 814 in the manner shown in Fig. 9, functions to magnify the natural cooling effect of the air vortex upon such resistor.

Because of the rapidity of travel of the material forming the balloon past any one location radially outwardly of the spindle, in some instances, where the material forming the anemometer resistance has a rather high "heat inertia," and where the galvanometer employed in the Wheatstone bridge circuit of which such anemometer is an element has a high mechanical inertia, it is possible to use an anemometer which has an angular extent around the spindle which is only a small part of 360°. One such arrangement is shown in Fig. 10, wherein a spindle schematically shown at 818 has the flyer 820 thereof forming the balloon 822. Such balloon travels, at its radially outermost zone, in the path designated 824. In the embodiment shown an electric resistance anemometer 826, of short angular extent, is placed at one location about the spindle at a position spaced radially of the path 824. The resistor 826 is supported in this instance on a relatively short guard member 832 which is supported on a vertical frame member 834. The guard member 832 has the portion thereof immediately at the rear of resistor 826 coaxial with it and coaxial with the flyer 820. The entering portion 833 of the guard is flared outwardly as shown so as to encourage the air at the radially outer fringe of the air vortex accompanying the balloon to pass along and through resistor 826.

As above indicated, the cooling effect of the vortex is strongest at the zone adjacent the material forming the balloon. Thus assuming a flyer speed of the order discussed, the resistor 826 will be cooled most severely at time periods spaced from each other by $\frac{1}{30}$ of a second. In between such times of greatest cooling the resistor will tend to heat up, although the cooling effect of the remainder of the air vortex will be operative upon it at all times. A graph of the resistance through resistor 826, in which resistance is plotted against time, will, therefore, be of a sine wave type. Upon a change of radial distance of the material forming the balloon from the resistor 826, however, the amplitude of such sine type wave will change, the frequency, of course, remaining constant. If, with the type of electric resistance anemometer shown in Fig. 10, a galvanometer of good sensitivity but with a substantial mechanical inertia is employed, such galvanometer will give an over-all reading which will be accurately indicative of changes in balloon diameter from a predetermined medial diameter thereof. Accordingly, the arrangement shown in Fig. 10 may be employed as an accurate measurement providing means for the diameter of the balloon, and also as an accurate control for the balloon diameter controlling mechanism previously discussed.

The leads 828 and 830 of resistor 826 will be connected into the Wheatstone bridge shown in Fig. 6 in the same manner as are the leads for the resistance anemometer shown in that figure.

In the various types of electric resistance anemometers before described such resistances which form the hot wire anemometers are heated by the same current which energizes the Wheatstone bridge. In some instances such arrangement may not be consistent with the accuracy desired of the galvanometer, since sensitivity of the galvanometer may have to be sacrificed for ruggedness where the bridge circuit carries large currents. To obviate such difficulties, and to improve the sensitivity of the anemometer, there may be employed, in some installations, the anemometer device shown in Figs. 11 and 12, wherein the electrical resistance anemometer element is heated from a source other than the source of current energizing the bridge circuit. Thus the bridge circuit may employ extremely minute currents and the galvanometer may thus be made extremely sensitive without the likelihood of its damage.

The boxlike conduit 836 shown in Fig. 11, made of refractory material such as magnesia, is designed to fit upon the end of the manifold jet shown in Figs. 5 and 6, the air from such jet proceeding through the conduit 836 in a direction normally outward from the paper in Fig. 11. Centrally of the refractory conduit 836 there is placed the vertical refractory tube 840 which may, if desired, be made integral with the conduit 836. Within tube 840 there is positioned the heating element 842 which may be powered through the leads 844 from a source of either alternating or direct current of very accurately controlled constant voltage. The tube 840 is provided over its major extent, that is, its front and side portions, with grooves 852 which are spaced vertically from each other as shown. The root portions of the thin ribbon-like electrical anemometer resistance element 846 are tightly pressed into such grooves, so as to provide good heat conductivity from the tube 840 to the element 846. Because of the configuration of the grooves the front and side portions of the elements of means 846 are disposed parallel to each other so as to allow the easy flow of air in the jet therepast. At the rear of the element, shown in Fig. 12, transition from one level to the next of the ribbon-like resistance is effected in the vertical steps 854, the anemometer resistance element fitting in grooves of such shape.

Connection is made to the opposite ends of the anemometer resistance element 846 by the lead 848 at the top thereof and the lead 850 at the bottom thereof. Such leads are connected to terminals as shown, lead wires being taken from such terminals to the above described Wheatstone bridge circuit, of which the element 846 forms one component resistance.

As above explained, the heating of element 846 is, in this instance, effected by the separate heater 842. The refractory tube 840 is thus highly heated and transmits its heat by conduction to the element 846, the heat proceeding from the roots thereof outwardly to the thus formed fins. The major portion of the element 846 is exposed to the air stream proceeding from the manifold surrounding the balloon spindle. Although the roots of the resistance element 846 are constantly heated, the average temperature of such element 846, and thus its over-all resistance, will bear a direct relationship to the speed of the air coming from such balloon and proceeding through the space 838 in the means 836. Thus the anemometer device of Figs. 11 and 12 is quite sensitive, exposing as it does a great area of the anemometer resistance to the stream of the air from the balloon. Also as above mentioned, such device allows the use of small energizing currents in the Wheatstone bridge, and thus the use of a rather delicate and quite sensitive galvanometer.

Although the apparatus and method of the invention have been described above in connection with the various detecting methods and apparatus as measuring the diameter of the balloon of the twisting spindle, and as controlling the balloon diameter in accordance with such measurement, it will be apparent that in the practice of the invention the measurement of the balloon diameter, with various known spindle components, will also give a measurement of the length of the elongated flexible material in the balloon. Thus, with a known constant spindle speed, a known flyer radius, a given speed of travel of the material through the spindle, a given height of the guiding eye above the spindle, and a given flyer and yarn passage configuration therein, when a given elongated flexible material of substantially uniform properties longitudinally thereof is twisted in the spindle, the balloon diameter and the length of the material in the balloon bear a determinable, fixed relationship to each other. Such relationship may readily be determined, with a given material and with the various spindle component factors constant, by taking ultra-high speed pictures of the spindle in operation, a succession of pictures being taken at a succession of balloon diameters differing from each other by small increments. The length of the material in the balloon corresponding to each balloon size may then readily be measured from the pictures, and a graph of such values made up.

Whereas for purposes of illustration I have shown and described preferred embodiments of the method of and apparatus for controlling the size of the cabling or take-up balloon in a system wherein a plurality of singles spindles feed into a take-up spindle, and I have also described and illustrated preferred embodiments of my improved balloon diameter and/or length measuring apparatus, it is to be understood that such embodiments are illustrative only and that the invention is capable of considerable variation as to details. The invention is, therefore, to be defined by the scope of the claims appended hereto.

I claim as new the following:

1. Apparatus for controlling the balloon of an elongated flexible material twisting spindle comprising means for detecting changes in the diameter of the balloon, a source of power, means selectively driven in reverse directions by the source of power to vary the tension of the elongated flexible material in the balloon, and means responsive to the means for detecting changes in the balloon diameter to control the source of power.

2. Apparatus for detecting changes in the diameter of an article of variable diameter rapidly rotating in a gaseous atmosphere comprising an electrical resistance bridge circuit containing a plurality of resistances of which one during operation is heated above atmospheric pressure, means mounting said heated resistance so as to be cooled by the gas of the vortex of gas created by the rapidly rotating article, a source of electric power connected in series with the bridge circuit, and a galvanometer connected across said circuit to indicate the state of balance or unbalance of the circuit.

3. Apparatus for controlling the balloon of an elongated flexible material twisting spindle comprising means for continuously detecting changes in the diameter of the balloon, said means comprising an electrical resistance bridge circuit containing a plurality of resistances of which one during operation is heated above atmospheric pressure, means mounting said heated resistance for exposure to the air of the air vortex created by the balloon, a source of electric power connected to the bridge circuit, and a galvanometer connected across said circuit to indicate the state of balance or unbalance of the circuit, a prime mover, means selectively driven in reverse directions by the prime mover to vary the tension of the elongated flexible material in the balloon, and means responsive to the galvanometer of the means for detecting changes in the balloon diameter to control the prime mover.

4. Apparatus for controlling the balloon of an elongated flexible material twisting spindle comprising means for continuously detecting changes in the diameter of the balloon, a driving shaft, means selectively driven in reverse directions by the driving shaft to vary the tension of the elongated flexible material in the balloon, and means responsive to the means for detecting changes in the balloon diameter to control the direction of rotation of the driving shaft.

5. Apparatus for controlling the balloon of an elongated flexible material twisting spindle comprising means for detecting changes in the diameter of the balloon, a reversible prime mover, a source of power for the prime mover connected thereto, means selectively driven in reverse directions by the prime mover to vary the tension of the elongated flexible material in the balloon, and means interposed between the source of power and the prime and responsive to the means for detecting changes in the balloon diameter to control the prime mover.

6. Apparatus for controlling the balloon of an elongated flexible material twisting spindle comprising means for detecting changes in the diameter of the balloon, a prime mover, tension varying means selectively driven by the prime mover in opposite directions to increase and decrease, respectively, the tension of the elongated flexible material in the balloon, and means responsive to the means for detecting changes in the balloon diameter to control the prime mover.

7. Apparatus for controlling the balloon of an elongated flexible material twisting spindle comprising means for continuously detecting changes in the diameter of the balloon, a reversible prime mover, tension varying means selectively driven by the prime mover in opposite directions to increase and decrease, respectively, the tension of the elongated flexible material in the balloon, and means responsive to the means for detecting changes in the balloon diameter to control the prime mover.

8. Apparatus for controlling the balloon of an elongated flexible material twisting spindle comprising means for detecting changes in the diameter of the balloon, a prime mover, tension varying means selectively driven by the prime mover in opposite directions to increase and decrease, respectively, the tension of the elongated flexible material in the balloon, and means responsive to the means for detecting changes in the balloon diameter upon a change in diameter of the balloon from a predetermined diameter to energize the prime mover to drive the tension varying means in such direction as to restore the balloon to said predetermined diameter.

9. Apparatus for controlling the balloon of an elongated flexible material twisting spindle comprising means for continuously detecting changes in the diameter of the balloon, a reversible prime mover, tension varying means selectively driven by the prime mover in opposite directions to increase and decrease, respectively, the tension of the elongated flexible material in the balloon, and means responsive to the means for detecting changes in the balloon diameter upon a change in diameter of the balloon from a predetermined diameter to energize the prime mover to drive the tension varying means in such direction as to restore the balloon to said predetermined diameter.

10. Apparatus for controlling the balloon of a spindle for twisting elongated flexible material comprising means for continuously detecting changes in the diameter of the balloon, a reversible prime mover, a source of power for such prime mover connected to the prime mover, tension varying means selectively driven by the prime mover in opposite directions to increase and decrease, respectively, the tension of the elongated flexible material in the balloon, and means responsive to the means for detecting changes in the balloon diameter upon a change in diameter of the balloon from a predetermined diameter to energize the prime mover to drive the tension varying means in such direction as to restore the balloon to said predetermined diameter.

11. Apparatus for controlling the balloon of a spindle for twisting elongated flexible material comprising means for continuously detecting changes in the diameter of the balloon, a reversible prime mover, a source of power for such prime mover connected thereto, tension varying means selectively driven by the prime mover in opposite directions to increase and decrease, respectively, the tension of the elongated flexible material in the balloon, and a direction reversing means interposed between the prime mover and the power source, said reversing means being actuated by and responsive to the means for detecting changes in the balloon diameter upon a change in diameter of the balloon from a predetermined diameter to energize the prime mover to drive the tension varying means in such direction as to restore the balloon to said predetermined diameter.

12. Apparatus for controlling the balloon of a spindle for twisting elongated flexible material comprising means for detecting changes in the diameter of the balloon, a reversible electrically actuated prime mover, a source of power for such prime mover connected thereto, tension varying means selectively driven by the prime mover in opposite directions to increase and decrease, respectively, the tension of the elongated flexible material in the balloon, and a reversing switch interposed between the prime mover and the power source, said reversing switch being actuated by and responsive to the means for detecting changes in the balloon diameter upon a change in diameter of the balloon from a predetermined diameter to energize the prime mover to drive the tension varying means in such direction as to restore the balloon to said predetermined diameter.

13. A spindle for twisting elongated flexible material, said spindle being of the type which creates and maintains a balloon of such material and which effects a twisting of the material in such balloon, said spindle having a driven balloon creating flyer, means engaging the elongated flexible material for subjecting the latter to selectively variable tension as it travels through the balloon, and means for controlling the balloon of such flyer, said last named means comprising means for detecting changes in the diameter of the balloon, a prime mover, a source of power for such prime mover connected thereto, tension varying means selectively driven by the prime mover in opposite directions to increase and decrease, respectively, the tension of the elongated flexible material in the balloon, and a drive direction reversing means interposed between the tension varying means and the power source, said reversing means being operated by and responsive to the means for detecting changes in the balloon diameter upon a change in diameter of the balloon from a predetermined diameter to drive the tension varying means in such direction as to restore the balloon to said predetermined diameter.

14. A spindle for twisting elongated flexible material, said spindle being of the type which creates and maintains a balloon of such material and which effects a twisting of the material in such balloon, said spindle having a driven balloon creating flyer, means engaging the elongated flexible material for subjecting the latter to selectively variable tension as it travels through the balloon, and means for controlling the balloon of such flyer, said last named means comprising means for continuously detecting change in the diameter of the balloon, a reversible prime mover, a source of power for such prime mover connected thereto, tension varying means selectively driven by the prime mover in opposite directions to increase and decrease, respectively, the tension of the elongated flexible material in the balloon, and a prime mover reversing means interposed between the prime mover and the power source, said reversing means being operated by and responsive to the means for detecting changes in the balloon diameter upon a change in diameter of the balloon from a predetermined diameter to energize the prime mover to drive the tension varying means in such direction as to restore the balloon to said predetermined diameter.

15. A spindle for twisting elongated flexible material, said spindle being of the type which creates and maintains a balloon of such material and which effects a twisting of the material in such balloon, said spindle having a driven balloon creating flyer, means engaging the elongated flexible material for subjecting the latter to selectively variable tension as it travels through the balloon, and means for controlling the balloon of such flyer, said last named means comprising means for continuously detecting changes in the diameter of the balloon, a reversible electric motor, a source of power for such motor connected thereto, tension varying means selectively driven by the motor in opposite directions to increase and decrease, respectively, the tension of the elongated flexible material in the balloon, and a reversing switch interposed between the motor and the power source, said reversing switch being operated by and responsive to the means for detecting changes in the balloon diameter upon a change in diameter of the balloon from a predetermined diameter to energize the motor to drive the tension varying means in such direction as to restore the balloon to said predetermined diameter.

16. A spindle for twisting elongated flexible material, said spindle being of the type which creates and maintains a balloon of such material and which effects a twisting of the material in such balloon, said spindle having a driven balloon creating flyer, and means for controlling the balloon of such flyer, said last named means comprising a rotatable roll engaging the elongated flexible material for subjecting the latter to selectively variable tension as it travels through the balloon, a variable brake means for said roll, means for detecting changes in the diameter of the balloon, a prime mover, a source of power for such prime mover connected thereto, brake actuating means selectively driven by the prime mover in opposite directions to increase and decrease, respectively, the tension of the elongated flexible material in the balloon, and a drive direction reversing means interposed between the brake actuating means and the power source, said reversing means being actuated by the means for detecting changes in the balloon diameter and responsive thereto upon a change in diameter of the balloon from a predetermined diameter to drive the brake applying means in such direction as to restore the balloon to said predetermined diameter.

17. A spindle for twisting elongated flexible material, said spindle being of the type which creates and maintains a balloon of such material and which effects a twisting of the material in such balloon, said spindle having a driven balloon creating flyer, and means for controlling the balloon of such flyer, said last named means comprising a rotatable roll engaging the elongated flexible material for subjecting the latter to selectively variable tension as it travels through the balloon, a variable brake means for said roll, means for continuously detecting changes in the diameter of the balloon, a reversible prime mover, a source of power for such prime mover connected thereto, brake actuating means selectively driven by the prime mover in opposite directions to increase and decrease, respectively, the tension of the elongated flexible material in the balloon, and a prime mover reversing means interposed between the prime mover and the power source, said reversing means being actuated by the means for detecting changes in the balloon diameter and responsive thereto upon a change in diameter of the balloon from a predetermined diameter to energize the prime mover to drive the brake applying means in such direction as to restore the balloon to said predetermined diameter.

18. A spindle for twisting elongated flexible material, said spindle being of the type which creates and maintains a balloon of such material and which effects a twisting of the material in such balloon, said spindle having a driven balloon creating flyer, means engaging the material beyond one end of the balloon for causing it to travel at a substantially constant speed thereat, and means for controlling the balloon of such flyer, said last named means comprising a rotatable roll engaging the elongated flexible material at a location beyond the other end of the balloon for subjecting the material to selectively variable tension as it travels through the balloon, a variable brake means for said roll, means for continuously detecting changes in the diameter of the balloon, a reversible electric motor, a source of power for such motor connected thereto, brake actuating means selectively driven by the motor in opposite directions to increase and decrease, respectively, the tension of the elongated flexible material in the balloon, and a reversing switch interposed between the motor and the power source, said reversing switch being actuated by the means for detecting changes in the balloon diameter and responsive thereto upon a change in diameter of the balloon from a predetermined diameter to energize the motor to drive the brake applying means in such direction as to restore the balloon to said predetermined diameter.

19. A strand-forming machine comprising a plurality of singles twisters, means for doubling the strands leading from the singles twisters into a plied strand, said singles twisters effecting a twisting operation in a first free-flying balloon, each singles twister including means to impose a back tension upon the strands prior to their entry into the first balloons, said doubling means effecting a twisting operation in a second free-flying balloon, the machine balancing the sum of the tensions in the first balloons against the tension in the second balloon at medial dimensions of such balloons, means for continuously detecting changes in the diameter of the second balloon, a balloon guiding eye adjusting reversible prime mover associated with at least one selected singles twister, a source of power for such prime movers connected thereto, means to adjust the guiding eye of each of the selected first balloons toward and away from its respective flyer to vary the height of the selected first balloons thus engaged by an adjustable eye, each of said last named means being selectively driven by its respective prime mover in opposite directions to increase and decrease, respectively, the tension of the elongated flexible material in the selected first balloons, and a prime mover reversing means interposed between each of the prime movers and the power source, said reversing means being operated by and being responsive to the means for detecting changes in the balloon diameter upon a change in diameter of the second balloon from a predetermined diameter to energize the prime movers to drive the means to vary the height of the selected first balloons in such direction as to restore the second balloon to said predetermined diameter.

20. A strand-forming machine comprising a plurality of singles twisters, means for doubling the strands leading from the singles twisters into a plied strand, said singles twisters effecting a twisting operation in a first free-flying balloon, each singles twister including means to impose a back tension upon the strands prior to their entry into the first balloons, said doubling means effecting a twisting operation in a second free-flying balloon, the machine balancing the sum of the tensions in the first balloons against the tension in the second balloon at medial dimensions of such balloons, means for continuously detecting changes in the diameter of the second balloon, a balloon guiding eye adjusting reversible electrically actuated prime mover associated with each singles twister, a source of power for such prime movers connected thereto, means to adjust the guiding eye of each of the first balloons toward and away from its respective flyer to vary the height of each of the first balloons and simultaneously to vary the back tension imposing means of each of the first balloons, each of said last named means being selectively driven by its respective prime mover in opposite directions to increase and decrease, respectively, the tension of the elongated flexible material in each of the first balloons, and a reversing switch interposed between each of the prime movers and the power source, said reversing switch being operated by and being responsive to the means for detecting changes in the balloon diameter upon a change in diameter of the second balloon from a predetermined diameter to energize the prime movers to drive the means to vary the height of the first balloons and simultaneously to vary the back tension imposing means of the first balloons in such direction as to restore the second balloon to said predetermined diameter.

21. Apparatus for controlling the balloon of an elongated flexible material twisting spindle comprising means for continuously feeding material into the balloon, means for continuously withdrawing material from the balloon, means for continuously detecting changes in the diameter of the balloon, a driving means, means selectively driven in reverse directions by the driving means operative to vary the relative speeds of the means for feeding the material into and the means for withdrawing the material from the balloon, and means responsive to the means for detecting changes in the balloon diameter to control the operation of the last named means by the driving means.

22. Apparatus for controlling the balloon of an elongated flexible material twisting spindle comprising means for continuously feeding material into the balloon, means for continuously withdrawing material from the balloon, a driving means, means for detecting changes in the peripheral speed of a portion of the balloon, and means responsive to the last named means selectively driven in reverse directions by the driving means operative to vary the relative speeds of the means for feeding the material into and the means for withdrawing the material from the balloon.

23. Apparatus for controlling the balloon of an elongated flexible material twisting spindle comprising means for continuously feeding material into the balloon, means for continuously withdrawing material from the balloon, a driving means, means for detecting changes in the speed of the air vortex set up by the balloon, and means responsive to the last named means selectively driven in reverse directions by the driving means operative to vary the relative speeds of the means for feeding the material into and the means for withdrawing the material from the balloon.

24. Apparatus for controlling the balloon of an elongated flexible material twisting spindle comprising means for continuously feeding material into the balloon, means for continuously withdrawing material from the balloon, a driving means, means for detecting changes in the pressure of the air vortex set up by the balloon, and means responsive to the last named means selectively driven in reverse directions by the driving means operative to vary the relative speeds of the means for feeding the material into and the means for withdrawing the material from the balloon.

25. A spindle for twisting elongated flexible material having substantially constant properties longitudinally thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, a source of power, means selectively driven in reverse directions by the source of power to vary the tension of the elongated flexible material in the balloon, and means operative in response to said means at the spindle for detecting changes in a phenomenon which is directly attendant upon the balloon to control the source of power whereby to vary the tension of the material in the balloon.

References Cited in the file of this patent

UNITED STATES PATENTS

| 2,030,110 | Keight | Feb. 11, 1936 |
| 2,397,153 | Naumann | Mar. 26, 1946 |
| 2,586,037 | Heffelfinger | Feb. 19, 1952 |
| 2,586,038 | Heffelfinger | Feb. 19, 1952 |
| 2,614,381 | Uhlig | Oct. 21, 1952 |

FOREIGN PATENTS

| 554,966 | Great Britain | July 27, 1943 |